Dec. 8, 1931.   R. C. McALLISTER   1,835,662
FLOATING PLUNGER
Filed Feb. 12, 1931
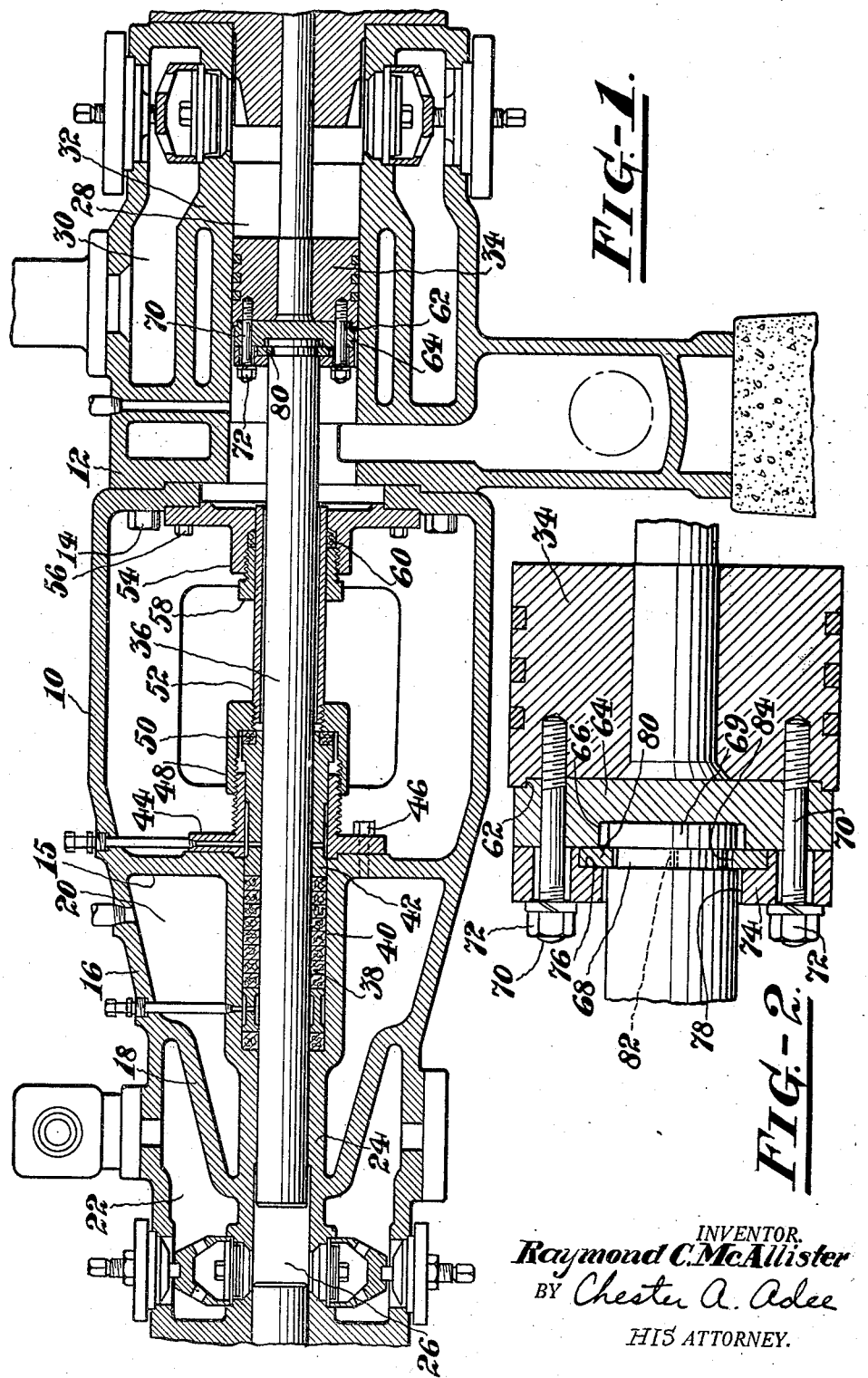
INVENTOR.
*Raymond C. McAllister*
BY *Chester A. Adee*
HIS ATTORNEY.

Patented Dec. 8, 1931

1,835,662

UNITED STATES PATENT OFFICE

RAYMOND C. McALLISTER, OF PAINTED POST, NEW YORK, ASSIGNOR TO INGERSOLL-RAND COMPANY, OF JERSEY CITY, NEW JERSEY, A CORPORATION OF NEW JERSEY

FLOATING PLUNGER

Application filed February 12, 1931. Serial No. 515,354.

This invention relates to floating plungers, but more particularly to a floating plunger forming part of a differential piston assembly in which the portions of different diameters are reciprocable in adjoining cylinders.

The invention is particularly applicable to compressors of the multi-stage type in which the several cylinders are disposed in the same longitudinal plane.

One object of the invention is to render a piston assembly flexible so that the several portions or members comprising the assembly may adjust themselves in their respective cylinders when the cylinders become disaligned due to variations in temperature or other causes.

Another object is to prevent relative longitudinal movement between the various members which comprise the piston assembly.

Other objects will be in part obvious and in part pointed out hereinafter.

Referring to the drawings accompanying this specification and in which similar reference numerals designate corresponding parts throughout the several views, Figure 1 is a longitudinal section of a portion of an air compressor having a differential piston, and Figure 2 is an enlarged fragmentary sectional view of a portion of the compressor embodying the invention.

Referring more particularly to the drawings, 10 designates the high pressure cylinder of the compressor having a lower pressure cylinder 12 secured to one end thereof as by means of bolts 14.

The high pressure cylinder 10 is divided by a wall 15 forming the usual head 16 which in turn is divided by the web 18 into a water jacket 20 and valve chamber 22. An inner cylindrical wall 24 formed, in this instance, integral with the wall 15 and web 18 extends longitudinally along the cylinder head 16 to form the high pressure piston chamber 26.

A piston chamber 28 and valve chamber 30 may be similarly formed in the lower pressure cylinder 12 by means of an inner cylindrical wall 32. A differential piston assembly, comprising in this instance a piston 34 reciprocable in the piston chamber 28 and having a plunger 36 connected thereto and extending into the piston chamber 26, is utilized to effect the compression of air in the respective piston chambers and will be hereinafter described more fully.

Suitable means are provided to prevent leakage of air from one cylinder to the other. To this end the wall 24 of the high pressure piston chamber is provided with a recess 38 for the reception of suitable packing 40. The packing 40 is retained in position by means of a packing gland 42 carried by a support plate 44 secured as by the bolts 46 to the wall 15. The gland 42 is retained in position and may be moved into engagement with the packing 40 by means of the gland nut 48 which threadedly engages the support plate 44. Additional packing 50 may be disposed between the contacting faces of the gland nut 48 and the gland 42.

Extending from the gland nut 48 and in threaded engagement therewith is a leak sleeve 52 which encircles the plunger 36 and is preferably slightly spaced therefrom. The other end of the leak sleeve 52 is supported in a bracket 54 which is secured, as by bolts 56, to the end wall of the cylinder 10. Leakage between the sleeve 52 and bracket 54 is prevented by the packing nut 58 and packing 60 which are disposed within the bracket 54 and encircle the sleeve 52.

In machines of this type relative disalignment between the cylinders, such as the cylinders 10 and 12, is at times caused by unequal expansion and contraction of these members due to variation in temperature. It therefore frequently happens that one or the other of the cylinders, together with the piston reciprocating therein, upon being subjected to higher temperatures, due to the heat of compression and other causes, than the adjacent cylinders is drawn out of alignment with the adjoining cylinder. This causes the piston reciprocating therein to bind on the cylinder walls.

In order to overcome this objectionable feature, the plunger 36 which forms the piston of the high pressure cylinder 10 is permitted to move transversely with respect to the piston 34 to which it is connected.

Accordingly, the piston 34 is provided with a recess 62 in one face for the reception of a flanged spacing member 64. The face of the spacing member 64 opposite the flange is provided with a recess 66 into which the end of the plunger 36 is adapted to extend. The recess 66 is preferably of larger diameter than the plunger 36 in order that the end of the plunger may move in a transverse direction in the recess.

Suitable means are provided to retain the plunger 36 against longitudinal movement with respect to the piston 34 while permitting transverse movement of the plunger. To this end an annular groove 68 is formed in the surface of the plunger adjacent the end disposed in the recess 66 and this groove 68 defines a head 69 on the plunger.

Secured, as by the studs 70 and nuts 72, to the spacing member 64 and piston 34 is a retaining plate 74. The retaining plate 74 is provided with a recess 76 which forms a continuation in the retaining plate of the groove 68 in the plunger. A central bore 78 enables the retaining plate 74 to be positioned on the plunger and this bore 78 is preferably sufficiently larger than the diameter of the plunger 36 to permit transverse movement of the plunger in the retaining plate 74. In order to connect the plunger to the piston 34 and maintain it against longitudinal movement with respect thereto, a locking ring 80 preferably having a slide fit in the groove 68 is positioned therein and extends into the recess 76 in the retaining plate 74.

The locking ring 80 which may be split as at 82 or formed in half sections may have a clearance 84 between its inner periphery and the bottom of the groove as shown, or have a clearance between its outer periphery and the recess 76 as will be apparent. The plunger 36 may accordingly be either movable transversely of the ring or the ring may be movable with the plunger transversely in the recess 76.

When the spacing member 64 and retaining member 74 are secured to the piston 34, the locking ring 80 will cooperate with these members to prevent longitudinal movement of the plunger 36 with respect to the piston 34 as will be apparent.

During the operation of the compressor, unequal expansion and contraction may take place between the cylinders 10 and 12, such as will cause the piston 34 and plunger 36 to be drawn out of alignment. It will be apparent, however that relative transverse movement of the piston 34 and plunger 36 may take place due to the floating arrangement of the connection of the plunger 36 to the piston 34. In this manner the plunger 36 and piston 34 may adjust themselves in such relation that binding of these members in their respective piston chambers will not occur should the cylinders become disaligned.

I claim:

1. In a piston assembly, the combination of a piston and a plunger movable longitudinally therewith, a spacing member between the piston and the plunger having a recess therein, a head on the plunger positioned in the recess and spaced from the peripheral wall thereof, a groove in the plunger adjacent its end defining said head, a retaining member on the plunger abutting the spacing member and having a recess encircling said groove, means positioned in the recess of the retaining member and projecting into the groove to retain the plunger against longitudinal movement relative to the piston, and means engaging the piston and extending through the spacing and retaining members to secure said members and the plunger to the piston, said plunger being movable transversely of the piston to permit relative axial disalignment therebetween.

2. In a piston assembly, the combination of a piston and a plunger movable longitudinally therewith, a perforated spacing member between the piston and the plunger having a recess therein, a head on the plunger positioned in the recess and spaced from the peripheral wall thereof, a retaining member on the plunger abutting the spacing member and having perforations therein opposite the perforations in the spacing member, and studs threadedly engaging the piston and extending through the perforations in the spacing and retaining members to secure said members and the plunger to the piston, said plunger being movable transversely of the piston to permit relative axial disalignment therebetween.

3. In a piston assembly, the combination of a piston and a plunger movable longitudinally therewith, a perforated spacing member between the piston and the plunger having a recess therein, a head on the plunger positioned in the recess and spaced from the peripheral wall thereof, a groove in the plunger adjacent its end defining said head, a retaining member on the plunger abutting the spacing member and having perforations therein opposite the perforations in the spacing member and having a recess encircling said groove, means positioned in the recess of the retaining member and projecting into the groove to retain the plunger against longitudinal movement relative to the piston, and studs threadedly engaging the piston and extending through the perforations in the spacing and retaining members to secure said members and the plunger to the piston, said plunger being movable transversely of the piston to permit relative axial disalignment therebetween.

4. In a piston assembly, the combination of a piston and a plunger movable longitudinally therewith, a perforated spacing member between the piston and the plunger having a recess therein, a flange on the spacing member interlockingly engaging the piston to retain said spacing member in axial alignment with the piston, a head on the plunger positioned in the recess and spaced from the peripheral wall thereof, a groove encircling the plunger adjacent its end and defining said head, a retaining member on the plunger abutting the spacing member and having perforations therein opposite the perforations in the spacing member and having a recess encircling said groove, a split locking ring positioned in the recess of the retaining member and projecting into the groove to retain the plunger against longitudinal movement relative to the piston, and studs threadedly engaging the piston and extending through the perforations in the spacing and retaining members to secure said members and the plunger to the piston, said plunger being movable transversely of the piston to permit relative axial disalignment therebetween.

In testimony whereof I have signed this specification.

RAYMOND C. McALLISTER.